United States Patent
Franke

(10) Patent No.: US 9,511,981 B2
(45) Date of Patent: Dec. 6, 2016

(54) CONNECTION BRACKET

(75) Inventor: Boris Franke, Heinsberg (DE)

(73) Assignee: SpanSet-secutex GmbH, Geilenkirchen (DE)

( * ) Notice: Subject to any disclaimer, the term of this patent is extended or adjusted under 35 U.S.C. 154(b) by 755 days.

(21) Appl. No.: 13/123,802

(22) PCT Filed: Oct. 7, 2009

(86) PCT No.: PCT/EP2009/063027
§ 371 (c)(1),
(2), (4) Date: Jun. 9, 2011

(87) PCT Pub. No.: WO2010/043523
PCT Pub. Date: Apr. 22, 2010

(65) Prior Publication Data
US 2011/0252721 A1    Oct. 20, 2011

(30) Foreign Application Priority Data
Oct. 13, 2008   (DE) .................. 10 2008 051 015

(51) Int. Cl.
*F16L 3/00*  (2006.01)
*B66C 1/66*  (2006.01)
(Continued)

(52) U.S. Cl.
CPC ............ *B66C 1/66* (2013.01); *B66C 1/108* (2013.01); *F03D 1/001* (2013.01); *F05B 2230/61* (2013.01);
(Continued)

(58) Field of Classification Search
CPC ........... B66C 1/66; B66C 1/108; F03D 1/001; F05B 2230/61; F05B 2240/916; Y02E 10/728; Y02P 70/523
(Continued)

(56) References Cited

U.S. PATENT DOCUMENTS 1,082,549 A * 12/1913 O'Rourke .................. 248/55
2,550,001 A *  4/1951 Button ..................... 248/49
(Continued)

FOREIGN PATENT DOCUMENTS

| CA | 2415410 A1 | 1/2002 |
|---|---|---|
| WO | 0204321 A2 | 1/2002 |
| WO | 2008000262 A1 | 1/2008 |

*Primary Examiner* — Gwendolyn Baxter
(74) *Attorney, Agent, or Firm* — The Webb Law Firm

(57) ABSTRACT

A connection bracket is provided in order to connect a connection, such as a shackle, hook or ring, to a flange, in particular to a flange of a tower element of a wind turbine, wherein the connection bracket (1) has two fixing sections (3a,3b), which are arranged at a distance (D) from each other and each have a support surface (3c) for laying the connection bracket (1) against the flange and a connection section (4), wherein the connection section (4) is formed from two supporting sections (7a, 7b) each firmly connected to one of the fixing sections (3a, 3b) and standing thereon, and a center section (6) carried by these supporting sections (7a, 7b) and firmly connected to them, such that the connection section (4) bridges the distance (D) between the fixing sections (3a, 3b) at a distance (Y) from the plane (E) of the support surface (3c), and wherein, in a top view seen from the side of the connection bracket (1) remote from the support surface (3c), the center line (M) of the center section (6) of the connection section (1) is arranged outside the envelope (U) of the fixing sections (3). The connection bracket can be manufactured cost-effectively and guarantees a high safety of use despite a reduced weight.

20 Claims, 2 Drawing Sheets

(51) Int. Cl.
*B66C 1/10* (2006.01)
*F03D 1/00* (2006.01)

(52) U.S. Cl.
CPC ........ *F05B 2240/916* (2013.01); *Y02E 10/728* (2013.01); *Y02P 70/523* (2015.11)

(58) Field of Classification Search
USPC ....... 248/49, 71, 80, 67.7; 52/677, 682, 685, 52/686, 687, 689
See application file for complete search history.

(56) References Cited

U.S. PATENT DOCUMENTS

| | | | | | |
|---|---|---|---|---|---|
| 3,414,219 | A | * | 12/1968 | Siegel | 248/65 |
| 4,080,770 | A | * | 3/1978 | Vigh | 52/689 |
| 4,733,835 | A | * | 3/1988 | Schlanger et al. | 248/71 |
| 4,899,963 | A | * | 2/1990 | Murphy | 248/65 |
| 5,072,901 | A | * | 12/1991 | Scott | 248/49 |

\* cited by examiner

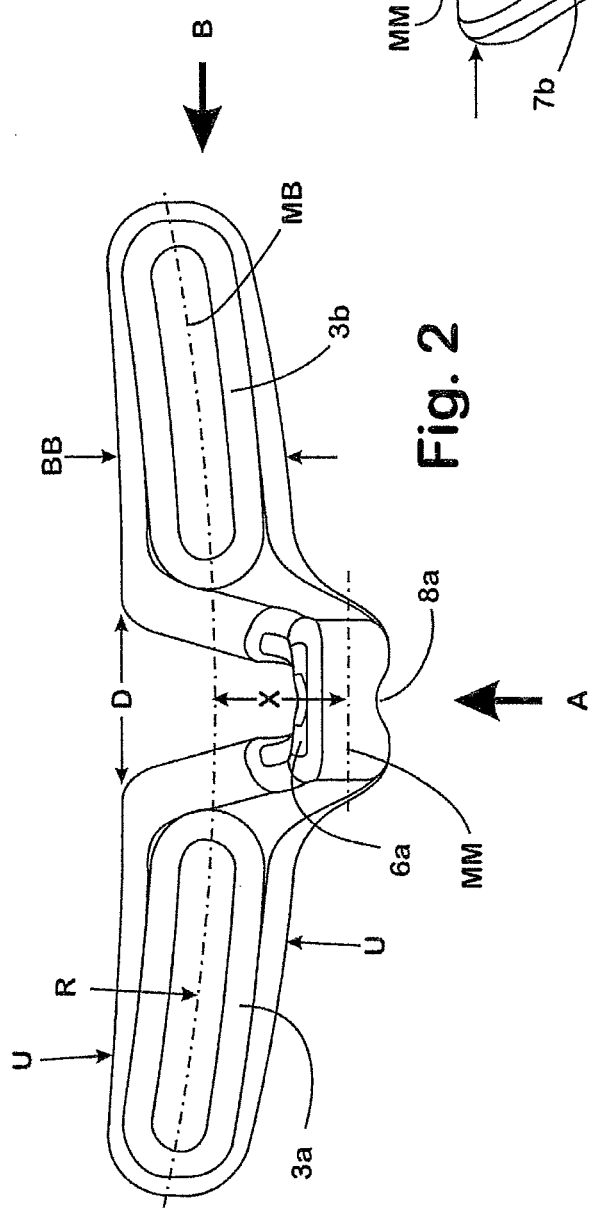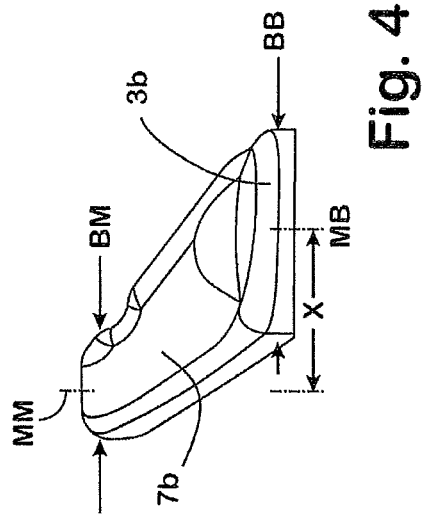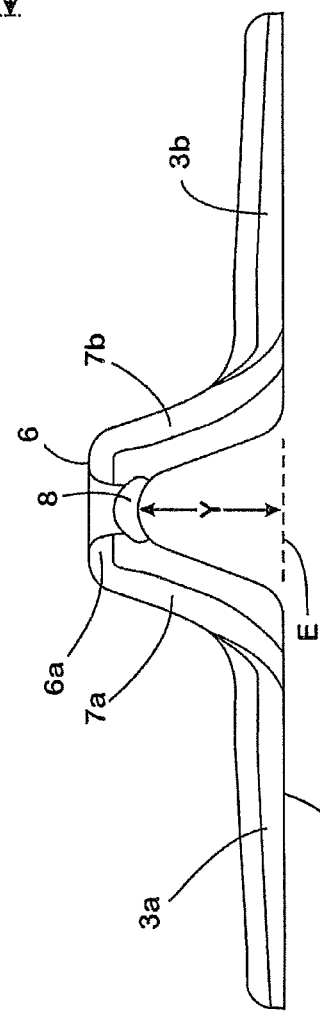

CONNECTION BRACKET

BACKGROUND OF THE INVENTION

1. Field of the Invention

The invention relates to a connection bracket, which is provided in order to connect a connection means to a flange, which in particular is the flange of a tower element for a wind turbine. Typically, shackles, hooks, rings or the like, by means of which a carrying means such as for example a cable, strip or belt can be detachably coupled with the connection bracket, serve as connection means to be coupled with the connection bracket.

2. Description of Related Art

The steel towers, carrying the hub of a rotor, of modern wind turbines are normally composed of a plurality of pre-fabricated, hollow-cylindrical tower elements. Normally, flanges directed inwardly are formed on the foot and head ends of these tower elements. Through-openings are moulded into the flanges at regular distances, which through-openings are aligned in the assembled state to the through-openings of the associated flange of the respective next highest or next lowest arranged tower element. Bolts are then inserted through the through-openings in order to connect the tower elements to one another.

Today, wind turbines are built with hub heights of over 100 m, such that the tubular tower elements with a wall thickness of 20 mm to 40 mm easily reach a mass in the high double-digit tonne range.

The diameter of the pre-fabricated tower elements is generally considerably smaller than the length thereof. Therefore, the tower elements are transported horizontally to the site of the wind turbine to be erected. At the site of the wind turbine they therefore not only need to be lifted by means of a suitable crane from the heavy goods transporter or ship used for conveying it and swivelling it into its final position, but they also need to be rotated from the horizontal alignment into a vertical alignment in order to set them down on a foundation or a tower element that has already been erected.

In order to make this possible using conventional lifting means, normally connection brackets of the type in question here are fixed to the flanges of the tower elements. As a rule, the through-openings present in the flanges are used for this.

High demands are placed on the connection brackets with regard to their load capacity and performance characteristics. Thus, they not only need to have a sufficient carrying capacity and be able to withstand the tough operating conditions, but they also need to make it possible for the tower elements to be aligned with pinpoint accuracy by means of the simple aids available at the site. At the same time, they need to be set up in such a way that the danger of injury to personnel on the site is minimised.

For lifting and aligning the tower elements, typically four connection elements are required on the head flange present at the upper end of the tower element and two connection elements on the foot flange present at the lower end of the tower element. The four connection elements associated with the head flange are distributed at regular angular distances over the periphery of the head flange and are screwed in place there such that the two upper connection elements and the two lower connection elements are respectively located substantially at a height in the tower element while it is still lying down.

The two connection elements associated with the foot flange are screwed on in the tower element that is lying down respectively above the centre line thereof at a distance from each other that is sufficiently large to keep the tower element in a stable position in relation to its longitudinal axis while it is lifted from the respective transporter and erected.

To erect a tower element, a first end of a supporting cable is attached onto the two connection elements, in the upper position on said tower element when it is lying down, of the head flange, for example by means of one shackle each. Each of these cables is then guided over a cable pulley, which hangs on the hook of a first crane, and, with its other end, is in turn coupled by means of a suitable connection means onto the lower connection element located respectively under the associated upper connection element.

In a comparable way, the two connection elements of the foot flange are connected to the hook of a second crane by means of a cable.

To erect the tower element, the latter is firstly lifted evenly by both cranes while maintaining its horizontal alignment, until a sufficient ground clearance is achieved. Then, the end of the tower element associated with the head flange is lifted to a greater extent such that the tower element in steadily converted into a vertical alignment. In this process, the cable pulleys guarantee that at all times the forces are introduced evenly into the cable strands in all four connection elements screwed onto the head flange, while the two connection elements attached to the foot flange serve as counter-bearings.

As soon as the tower element is aligned vertically, the carrying means associated with the foot flange are relieved of their load and the corresponding connection elements can be disassembled. In this state, the tower element now hangs only from the four connection elements screwed onto the head flange. Once the connection elements have been removed from the foot flange, the tower element can be swivelled into the intended end position and screwed in place there onto the foundation or the tower element already present.

During the erection process, the respective carrying means used (cable, strip) are subjected to considerable loads. They must therefore not only absorb the load of the tower element, but at the same time they are also moved relative to the cable pulleys of the cranes. In particular in the carrying means associated with the foot flange of the tower element to be erected, there is also the danger that during the erection the carrying means is pulled over one of the comparatively sharp-edged outer edges of the tower. Due to the relative movements that unavoidably occur there during erection, this leads to considerable wear through rubbing in the affected region of the carrying means. This can very quickly go so far that the carrying means becomes unusable. For this reason, the clear stipulation exists that the connection elements used for attaching the carrying means to the flange must guide the respective carrying means such that rubbing against an outer edge of the tower element is excluded.

This requirement can be fulfilled using a known "flange load-ring". The known flange load-rings are composed of a plate-shaped fixing section, which is provided with openings for screwing-in on a flange of the respective tower, and a ring element pivotably mounted on the fixing section.

In the known flange ring, two bolts aligned coaxially to each other are tangentially welded onto the ring element and sit in corresponding bearing openings of the fixing section and thus define the swivel axis of the ring element. The bearing openings are arranged on a longitudinal side of the fixing section in relation to the fixing openings thereof such that the swivel axis in the flange load-ring assembled on the respective flange of a tower element is arranged outside the periphery of the tower element. In this way, it is guaranteed that the carrying means is guided during swivelling of the tower element such that it does not come into contact with any edge of the tower element.

However, the known flange load-rings are expensive to manufacture due to their elaborate design. In addition, they need to be constructed with sufficient weight that they can absorb the loads to which they are subjected in practical use with the necessary security. This leads to such a great weight that they are difficult to handle on site.

Against this background, the object of the invention was to make available a connection element that can be manufactured cost-effectively, in which a high safety of use is guaranteed despite a reduced weight.

SUMMARY OF THE INVENTION

A connection bracket according to the invention has two fixing sections, by means of which, as in the prior art explained above, the connection bracket can be screwed onto the respective flange. For this, the fixing sections possess a support surface, which as a rule will be even and serves to lay the connection bracket against the respective flange.

The fixing sections of a connection bracket according to the invention are arranged at a distance from each other, wherein between them a connection section is present, which bridges the distance between the fixing sections.

The connection section is formed from two supporting sections each firmly connected to one of the fixing sections and standing thereon, and a centre section carried by these supporting sections and firmly connected to them, such that the connection section spans the distance between the fixing sections at a distance from the plane of the support surfaces.

What is substantial for the function of a connection bracket according to the invention in this situation is that, in a top view seen from the side of the connection bracket remote from the support surfaces, the centre line of the centre section of the connection section is arranged outside the envelope of the fixing sections. In this way, in practical use the carrying means coupled with a connection bracket according to the invention is always guided such that it runs laterally past the respective component to be lifted. The further the centre line of the centre section of the connection section lies outside the envelope of the fixing sections in this situation, the greater the certainty that there will not be any damage to the respective carrying means.

Accordingly, in an embodiment of the invention that is particularly usable in practice, in a top view seen from the side of the connection bracket remote from the support surfaces, the centre section of the connection section is arranged entirely outside the envelope of the fixing sections. This embodiment of the invention proves to be particularly advantageous when the respective carrying means engages directly, i.e. without intermediate connection means, with the connection bracket.

A connection bracket according to the invention has a design that is particularly simple to manufacture. In the region of its connection section, sufficient space can be made available for every type of suitable connection means (for example shackle, hook, ring) to be able to be assembled there in a simple manner with the necessary mobility, without the need for great effort. There is also no need for particular additional structural components.

Instead, a connection bracket according to the invention is distinguished by the fact that its individual sections are firmly and non-detachably connected to one another. Its one-piece design allows the bracket according to the invention to be manufactured from one part, i.e. integrally, for example by forging.

The fact that at least the internal sides of the connection section that are associated with the space laterally delimited by the supporting sections of the connection section converge in the form of a pointed arch means that a situation is achieved whereby the connection means respectively cooperating with the connection bracket or the carrying means respectively engaging directly with the connection bracket, under load, independently reaches the optimum position on the centre section of the connection section for the carrying task to be undertaken. To this end, the connection section of the connection bracket according to the invention can be designed such that the internal sides of the supporting sections converge in an inverted V-shape.

The fact that the connection means cooperating with the connection bracket according to the invention or the carrying means coupled directly with it finds its respective optimum position under load can also be supported by the fact that the region in which the internal sides of the supporting sections meet is rounded in the manner of a groove. A fillet of the groove, which is only slightly larger than the radius of the respective connection element, is particularly practice-oriented here. Thus, the fillet of the respectively present groove can correspond for example to the outer radius of a standard shackle such that the vast majority of the shackles used in practice can cooperate optimally with a connection bracket according to the invention.

The optimal positioning of the respective connection means or of the carrying means cooperating with the connection bracket according to the invention can be supported by the fact that a groove-type recess is moulded from the space laterally delimited by the connection section into the centre section, which recess forms a positioning for the connection means. In this situation, the relevant recess can in particular act in the manner of a bearing defining a swivel axis when the recess at least on one side of the connection element reaches as far as the free upper side of the centre section. In this way, a situation can be achieved whereby the respective connection means or carrying means is also guided in a defined manner in the region of its deflection around the centre section.

Since the width of the supporting sections proceeding from the fixing section respectively associated with them decreases in the direction of the centre section, a situation can be achieved whereby the tensile forces acting in practical use on the connection bracket are introduced into the connection bracket in an alignment that is optimal with regard to the load state. When the supporting sections taper towards the centre section, it can be guaranteed, including when a portion is pulled in the direction of the flange, that the force is introduced substantially over the centre section and the carrying means does not slip on the connection bracket. In addition, in this way a connection bracket according to the invention, with reduced weight, is particularly well adapted to the distribution of stress in the supporting section under the loads occurring in practice.

In the transition region from the supporting section to the centre section, a recess can also be moulded into the supporting section such that the width of the supporting section in a zone in the transition region to the centre section corresponds to the width of the centre section. In this way it can be guaranteed that a connection means can be swivelled in its longitudinal extent towards the fixing section, even when it lies close against the centre section. For this purpose, a groove-type recess can be moulded in at least one of the transition regions, in which the supporting sections proceed to the centre section, from the space laterally defined by the connection section. Optimal mobility of the respective connection means in the opening defined by the connection section of the connection bracket according to the invention results when the recess reaches as far as the external side of the respective supporting section.

A particularly simple configuration of the connection bracket according to the invention with particular versatility at the same time results when the connection bracket is designed to be mirror-symmetrical to a plane, which is aligned perpendicular to the support surfaces of the fixing sections.

Fundamentally, any fixing of a connection bracket according to the invention onto the respective flange is conceivable which is sufficiently firm to absorb the loads occurring during a lifting and aligning process. The fixing can be executed particularly simply when through-openings present on the respective component to be transported are used for this purpose. This is in particular the case when the through-openings, as is the case in the flanges of a tower for a wind turbine, have the dimensions of conventional screw openings. In this case, a simple screw fixing of a connection bracket according to the invention can be executed in that through-openings aligned perpendicular to the support surface are moulded into the fixing sections. At least one of these through-openings is advantageously designed as an elongated hole in order to be able to line up the respective through-openings of connection bracket and load to be transported with one another even when the through-openings of the load to be transported are arranged at different distances. In this way, not only can tolerances be compensated, but also the connection bracket according to the invention can be implemented with unchanged dimensions on a large number of different components. As a result, it is possible to line up the elongated hole of one of the fixing sections with a plurality of bores of the flange and to screw it in place with more than one screw. As a result, the loads for the respective screw can be considerably reduced.

In such cases, in which the respective through-openings are arranged on a circular arc, such as is for example the case with the openings of a flange of a tower of a wind turbine, it is shown to be beneficial when the elongated hole is designed to be arc-shaped. A particularly great versatility of the use of a connection bracket configured according to the invention results when both fixing sections have an arc-shaped elongated hole and the centre lines of the elongated holes are arranged on a common arc. As a result, it is possible to line up the elongated hole of one of the fixing sections with a plurality of bores of the flange and to screw it in place with more than one screw. As a result, the loads for the respective screw can be considerably reduced. Alternatively, it may, however, be expedient for the arcs on which the centre lines of the elongated holes of both fixing sections of a connection bracket according to the invention lie to be differently curved such that the same connection bracket can be used for flanges with different hole circle diameter.

In particular when the width of the even support section is greater than or equal to the length of a circumference section formed by the angle created by the internal surfaces of the supporting sections and the radius of the rounding, a shackle used for connecting the carrying means can run along the support section.

BRIEF DESCRIPTION OF THE DRAWINGS

The invention will be explained in more detail in the following using a drawing showing exemplary embodiments. They show schematically:

FIG. 2 the connection bracket in the top view;
FIG. 3 the connection bracket in a side view from the direction A entered in FIG. 2;
FIG. 4 the connection bracket in a side view from the direction B entered in FIG. 2.

DESCRIPTION OF THE PREFERRED EMBODIMENTS

Figure 1:
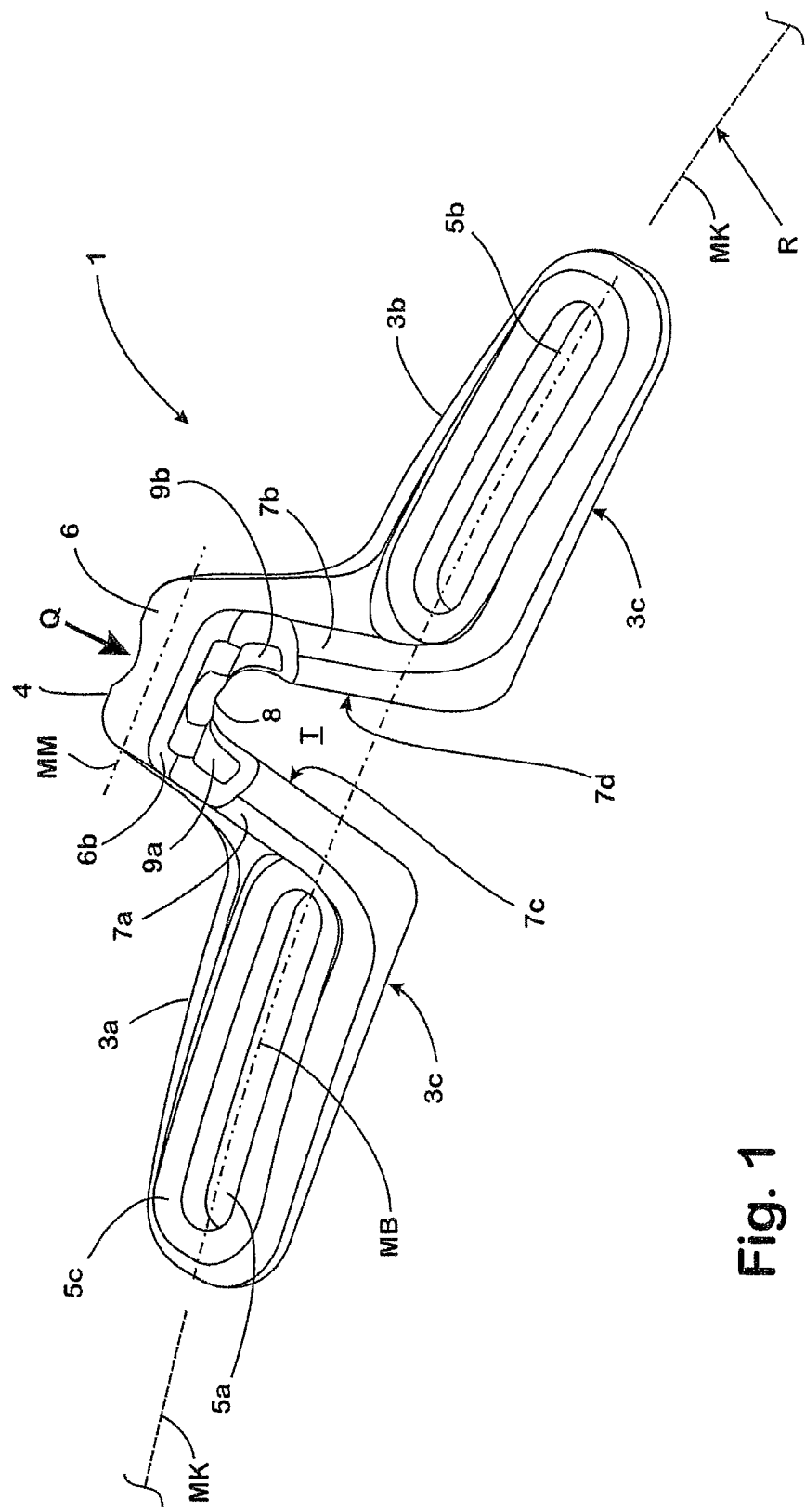
FIG. 1 a connection bracket in perspective view.

The connection bracket 1 is manufactured using forging technology as one piece. It has two fixing sections 3a, 3b arranged at a distance D from each other and a connection section 4, which spans the distance D between the fixing sections 3a, 3b in the manner of a bridge.

The fixing sections 3a, 3b are, seen in a top view (FIG. 2), each longitudinally designed with a slight curvature. The curvature of the centre line MB of the fixing sections 3a, 3b corresponds to the radius R of a centre circle MK of a ring flange, not shown here, on which the connection bracket 1 is to be assembled. On the centre circle MK lie the centre points of through-openings, likewise not shown here, arranged distributed at regular angular distances, which through-openings are moulded into the relevant flange. The flange can be part of a tower element, not shown here, for a wind turbine.

In order to be supported on the respective front surface of the flange, the fixing sections each have a planar support surface 3c on their underside.

A respective elongated-hole opening 5a, 5b reaching from the upper side as far as the support surface 3c of the respective fixing section is moulded into the fixing sections 3a, 3b, which elongated-hole opening 5a, 5b extends approximately over the entire length of the respective fixing element 3a, 3b and is curved in a corresponding manner to the common centre line MB of the fixing sections 3a, 3b.

The upper side of the boundary regions 5c delimiting the elongated-hole openings 5a, 5b is likewise designed to be even and forms a support surface for fixing screws, not shown here, which are inserted through the elongated-hole openings 5a, 5b and the through-openings of the flange that are lined up with the elongated-hole openings 5a, 5b, in order to fix the connection bracket 1 onto the flange.

The connection section 4 of the connection bracket 1 is designed in the manner of a bridge and has a centre section 6, which is carried by two supporting sections 7a, 7b. The length of the supporting sections 7a, 7b establishes the distance Y of the centre section 6 from the plane E of the support surface 3c of the connection element 1.

The width BM of the centre section 6 is smaller than the width BB of the fixing sections 3a, 3b. Seen from a top view of the connection bracket 1, the centre line MM of the centre section 6 is shifted in relation to the centre line MB of the fixing sections 3a, 3b by a distance X so far in the direction of the external side of the arc described by the curved centre line MB of the fixing sections 5a, 5b that the centre section 6 of the connection section 4 lies fully outside the envelope U of the fixing elements 3a, 3b in top view (FIG. 2, 3).

The supporting sections 7a, 7b of the connection section 4 diverge from the ends, associated with one another, of the fixing sections 3a, 3b and taper from the width BB of the fixing sections 3a, 3b until they have the width BM of the centre section 6 at their end associated with the centre section 6. The internal sides 7c, 7d, associated with one another, of the supporting sections 7a, 7b converge in the direction of the centre section 6 in an inverted V-shape and meet in a groove-type recess 8 moulded into the underside of the centre section 6, which recess 8 extends over the width BM of the centre section 6. The recess 8 reaches as far as the free side surfaces 6a, 6b of the centre section 6. The section 8a, moulded into the side surface 6b of the centre section 6, which side surface 6b lies on the external side in relation to the centre line of the fixing sections 5a, 5b, of the recess 8 is more deeply pronounced, such that there a bearing surface designed in the manner of a bearing shell for the respective connection means not shown here is formed when the load Q acting on the connection bracket 1 is aligned perpendicular to the side surface 6b.

The latter is for example the case when a tower element transported horizontally is firstly aligned vertically and is then turned into the horizontal. In the space T laterally defined by the connection section 4, between the two fixing sections 3 a place necessary for swivelling in a connection element, such as shackle bracket, ring, snap hook or the like, is available.

In addition to the recess 8, on the side of the connection bracket 1 which lies on the inner side in relation to the arc described by the centre line MB, a groove 9a, 9b is moulded into each of the transition regions between the supporting sections 7a, 7b and the centre section 6. The grooves 9a, 9b also serve, during the alignment of the respective component, as guide of a connection means, which is guided through the space T defined by the connection section 4.

REFERENCE NUMERALS

1 Connection bracket
3a, 3b Fixing sections
3c Support surface of the fixing sections 3a, 3b
4 Connection section
5a, 5b Elongated-hole openings of the fixing elements 3a, 3b
5c Boundary regions of the elongated-hole openings 5a, 5b
6 Centre section of the connection section 4
6a, 6b Side surfaces of the centre section 6
7a, 7b Supporting sections of the connection section 4
7c, 7d Internal sides of the supporting sections 7a, 7b
8 Recess
8a Section of the recess 8
9a, 9b Groove
BB Width of the fixing sections 3a, 3b
BM Width of the centre section 6
D Distance between the fixing sections 3a, 3b
E Plane of the support surface 3c of the connection element 1
MB Centre line of the fixing section 3a, 3b
MK Centre circle
MM Centre line of the fixing section 3a, 3b
Q Load
R Radius of the centre circle MK
T Space laterally defined by the connection section 4
U Envelope of the fixing sections
X Distance of the centre line MM from the centre line MB in a top view
Y Distance of the centre section 6 from the plane E of the support surface 3c of the connection bracket 1

The invention claimed is:

1. A connection bracket configured to connect a connection means to a flange of a tower element of a wind turbine, the connection bracket comprising:
two fixing sections and a connection section, wherein the two fixing sections are arranged at a distance from each other and each have a support surface for laying the connection bracket against a flange,
wherein the connection section is formed from two supporting sections, each supporting section having a first end connected to one of the fixing sections, and a center section extending between the supporting sections and connected to the supporting sections at a second end of the supporting sections, such that the connection section bridges the distance between the fixing sections at a distance relative to a plane of the support surface, and
wherein, in a top plan view seen from above the plane of the support surface, a center line extending in a longitudinal direction of the center section of the connection section is arranged outside an envelope defined by the fixing sections and a space therebetween delimited laterally by a width of the fixing sections.

2. The connection bracket according to claim 1, wherein, in the top plan view, the center section of the connection section is arranged entirely outside the envelope of the fixing sections.

3. The connection bracket according to claim 1, wherein the connection bracket is designed integrally.

4. The connection bracket according to claim 3, wherein the connection bracket is a forged part.

5. The connection bracket according to claim 1, wherein at least internal sides of the connection section that are associated with a space laterally delimited by the supporting sections of the connection section converge in the form of a pointed arch.

6. The connection bracket according to claim 5, wherein the internal sides of the supporting sections converge in an inverted V-shape.

7. The connection bracket according to claim 5, wherein a region in which the internal sides of the supporting sections meet is rounded in the manner of a groove.

8. The connection bracket according to claim 1, wherein a width of the supporting sections proceeding from the fixing section respectively associated with the supporting sections decreases in a direction toward the center section.

9. The connection bracket according to claim 1, wherein the center section of the connection section has a lesser width than the fixing sections.

10. The connection bracket according to claim 1, wherein a recess comprising a groove is molded in at least one of the transition regions, in which the supporting sections proceed to the center section, from a space laterally defined by the connection section.

11. The connection bracket according to claim 10, wherein the recess reaches as far as an external side of the respective supporting section.

12. The connection bracket according to claim 1, wherein the connection bracket is mirror-symmetrical relative to a plane perpendicular to the plane of the support surface of the fixing sections.

13. The connection bracket according to claim 1, wherein through-openings aligned perpendicular to the support surface are molded into the fixing sections.

14. The connection bracket according to claim 13, wherein at least one of the through-openings is an elongated hole.

15. The connection bracket according to claim 14, wherein the elongated hole is arc-shaped.

16. The connection bracket according to claim 15, wherein both fixing sections have an arc-shaped elongated hole and center lines of the elongated holes are arranged on a common arc.

17. The connection bracket according to claim 1, wherein a recess comprising a groove is molded into the center section from a space laterally delimited by the connection section, which recess forms a bearing for the connection means.

18. The connection bracket according to claim 17, wherein the recess is arranged centrally between the supporting sections.

19. The connection bracket according to claim 18, wherein the recess at least on one side of the connection element reaches as far as the free upper side of the center section.

20. The connection bracket according to claim 17, wherein the recess at least on one side of the connection element reaches as far as the free upper side of the center section.

* * * * *